United States Patent
Moon et al.

(10) Patent No.: US 9,154,275 B2
(45) Date of Patent: Oct. 6, 2015

(54) CROSS-CARRIER SCHEDULING METHOD OF UPLINK IN CARRIER AGGREGATION SYSTEM, AND TERMINAL

(75) Inventors: Sung Ho Moon, Anyang-si (KR); Min Seok Noh, Anyang-si (KR); Jae Hoon Chung, Anyang-si (KR); Seung Hee Han, Anyang-si (KR); So Yeon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 254 days.

(21) Appl. No.: 13/511,720

(22) PCT Filed: Nov. 19, 2010

(86) PCT No.: PCT/KR2010/008190
§ 371 (c)(1),
(2), (4) Date: May 24, 2012

(87) PCT Pub. No.: WO2011/065704
PCT Pub. Date: Jun. 3, 2011

(65) Prior Publication Data
US 2012/0287878 A1    Nov. 15, 2012

Related U.S. Application Data

(60) Provisional application No. 61/264,664, filed on Nov. 26, 2009, provisional application No. 61/267,388, filed on Dec. 7, 2009.

(30) Foreign Application Priority Data

Nov. 8, 2010    (KR) ......................... 10-2010-0110308

(51) Int. Cl.
*H04L 5/00*     (2006.01)
*H04W 72/04*    (2009.01)
*H04W 72/12*    (2009.01)

(52) U.S. Cl.
CPC .............. *H04L 5/001* (2013.01); *H04L 5/0044* (2013.01); *H04W 72/0406* (2013.01); *H04W 72/12* (2013.01)

(58) Field of Classification Search
CPC . H04L 5/001; H04L 5/0044; H04W 72/0406; H04W 72/12
See application file for complete search history.

(56) References Cited

U.S. PATENT DOCUMENTS

| 2009/0290538 A1 | 11/2009 | Kim et al. | |
| 2010/0254329 A1* | 10/2010 | Pan et al. | 370/329 |
| 2010/0296473 A1 | 11/2010 | Kim et al. | |
| 2010/0322158 A1* | 12/2010 | Lee et al. | 370/329 |

FOREIGN PATENT DOCUMENTS

| KR | 10-2009-0086040 A | 8/2009 |
| KR | 10-2009-0111271 A | 10/2009 |

OTHER PUBLICATIONS

3GPP, "Evolved Universal Terrestrial Radio Access (E-UTRA); Physical layer procedures", ETSI TS 136 213 V8.8.0 (Oct. 2009).*

(Continued)

*Primary Examiner* — Omer S Mian
(74) *Attorney, Agent, or Firm* — Birch, Stewart, Kolasch & Birch, LLP

(57) ABSTRACT

An uplink cross-carrier scheduling method in a carrier aggregation system is provided. The method includes: receiving information for an uplink component carrier (UL CC) monitoring set from a base station; receiving control information through a downlink component carrier (DL CC) determined on the basis of the information for the UL CC monitoring set; and transmitting an uplink signal to the base station on the basis of the control information.

2 Claims, 17 Drawing Sheets

(56) References Cited

OTHER PUBLICATIONS

LG Electronics, "Component carrier indication by PDCCH for multiple carrier aggregation in LTE-Advanced", 3GPP TSG RAN WG1 #57bis, R1-092500, Jun. 29-Jul. 6, 2009.

LG Electronics, "UE-specific Carrier Assignment for LTE-Advanced", 3GPP TSG RAN WG1 #57bis, R1-092505, Jun. 29-Jul. 3, 2009.

* cited by examiner (a) # of DL CC (component carrier) ># of UL CC (b) # of UL CC > # of DL CC

CROSS-CARRIER SCHEDULING METHOD OF UPLINK IN CARRIER AGGREGATION SYSTEM, AND TERMINAL

CROSS REFERENCE TO RELATED APPLICATIONS

This application is the National Phase of PCT/KR2010/008190 filed on Nov. 19, 2010, which claims priority under 35 U.S.C. 119(e) to U.S. Provisional Application Nos. 61/264,664 filed on Nov. 26, 2009, and 61/267,388 filed on Dec. 7, 2009, and under 35 U.S.C. 119(a) to Patent Application No. 10-2010-0110308 filed in Korea on Nov. 8, 2010, all of which are hereby expressly incorporated by reference into the present application.

TECHNICAL FIELD

The present invention relates to wireless communication, and more particularly, to an uplink cross-carrier scheduling method in a carrier aggregation system and a user equipment using the method.

BACKGROUND ART

One of the most important requirements of a next generation wireless communication system is to support a required high data rate. For this, various techniques such as multiple input multiple output (MIMO), cooperative multiple point transmission (CoMP), relay, etc., have been under research, but the most fundamental and reliable solution is to increase a bandwidth.

However, a frequency resource is in a saturation state at present, and various schemes are partially used in a wide frequency band. For this reason, in order to ensure a broadband bandwidth to satisfy a required higher data rate, a system is designed to satisfy a basic requirement which requires separate bands capable of operating respective independent systems, and a carrier aggregation (CA) is introduced. In concept, the CA aggregates a plurality of bands into one system. In this case, each band that can be independently managed is defined as a component carrier (CC).

To support growing transmission capacity, the 3GPP LTE or the 802.16m has recently expanded its bandwidth to 20 MHz or higher. In this case, a wideband is supported by aggregating one or more CCs. For example, if one CC corresponds to a bandwidth of 5 MHz, four carriers are aggregated to support a bandwidth of up to 20 MHz.

As such, a plurality of CCs are used in the carrier aggregation system. In this case, a user equipment (UE) may have the following features: 1) a CC for receiving downlink control information from a base station (BS) may be set differently from a CC for receiving downlink data; or 2) links of a CC for receiving downlink control information and a CC for transmitting an uplink signal may follow a link relation different from a link determined in the existing LTE. Such a scheduling method is called cross-carrier scheduling. The cross-carrier scheduling can be called downlink cross-carrier scheduling in the former caser, and can be called uplink cross-carrier scheduling in the latter case.

A method of applying the uplink cross-carrier scheduling has not been defined yet for a case where the cross-carrier scheduling is applied to the carrier aggregation system.

SUMMARY OF INVENTION

Technical Problem

The present invention provides an uplink cross-carrier scheduling method in a carrier aggregation system and a user equipment using the method.

Technical Solution

According to an aspect of the present invention, an uplink cross-carrier scheduling method in a carrier aggregation system is provided. The method includes: receiving information for an uplink component carrier (UL CC) monitoring set from a base station; receiving control information through a downlink component carrier (DL CC) determined on the basis of the information for the UL CC monitoring set; and transmitting an uplink signal to the base station on the basis of the control information.

In the aforementioned aspect of the present invention, the information for the UL CC monitoring set may be received through a higher layer signal or a physical layer signal.

In addition, a DL CC indicated by the information on the UL CC monitoring set may be identical to a DL CC monitoring set in which the base station transmits control information for a downlink data channel.

In addition, the information for the UL CC monitoring set may include an indicator indicating whether it is the identical to the DL CC monitoring set.

In addition, a DL CC indicated by the information for the UL CC monitoring set may be not identical to a DL CC monitoring set in which the base station transmits control information for a downlink data channel.

In addition, the information for the UL CC monitoring set may indicate a DL CC included in the UL CC monitoring set in a bitmap format among a plurality of DL CCs assigned to a user equipment.

In addition, the information for the UL CC monitoring set may indicate the number of DL CCs included in the UL CC monitoring set with respect to a lowest CC index or a highest CC index among a plurality of DL CCs assigned to a user equipment.

In addition, the method further includes receiving information for an assigned DL CC set and information for a DL CC monitoring set included in the DL CC set from the base station. Herein, if a DL CC indicated by the information for the DL CC set and a DL CC indicated by the information for the DL CC monitoring set correspond to a specific DL CC, it may be interpreted such that control information included in the specific DL CC does not include a carrier indication field.

In addition, the method further includes receiving information for a DL CC monitoring set from the base station. Herein, information for the DL CC monitoring set may include an indication indicating whether control information of a DL CC included in the DL CC monitoring set includes a carrier indication field.

In addition, whether the carrier indication field is included in the control information of the DL CC included in the UL CC monitoring set may be determined according to a value indicated by the indicator.

In addition, indication information indicating whether the control information includes a carrier indication field may be received from the base station a specific number of subframes before a subframe in which the control information is transmitted. Herein, the specific number may be 4.

According to another aspect of the present invention, a user equipment in a carrier aggregation system is provided. The user equipment includes: a radio frequency (RF) unit transmitting and receiving a radio signal; and a processor coupled to the RF unit, wherein the processor receives information for a UL CC monitoring set from a base station, receives control information through a DL CC determined on the basis of the information for the UL CC monitoring set, and transmits an uplink signal to the base station on the basis of the control information.

Advantageous Effects

According to the present invention, the number of component carriers for monitoring a physical downlink control channel (PDCCH) for a downlink and an uplink can be set differently in a carrier aggregation system using a plurality of component carriers. The number of uplink component carriers can be controlled in accordance with an amount of uplink data transmitted by a user equipment to a base station. In this case, the number of component carriers for monitoring the PDCCH for the uplink can be properly controlled, and as a result, the number of blind decoding attempts of the user equipment can be decreased and battery consumption can also be decreased.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is an evolution of IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE.

For clarity, the following description assumes a situation where the present invention applies to an LTE-A system. However, technical features of the present invention are not limited thereto.

Figure 1:
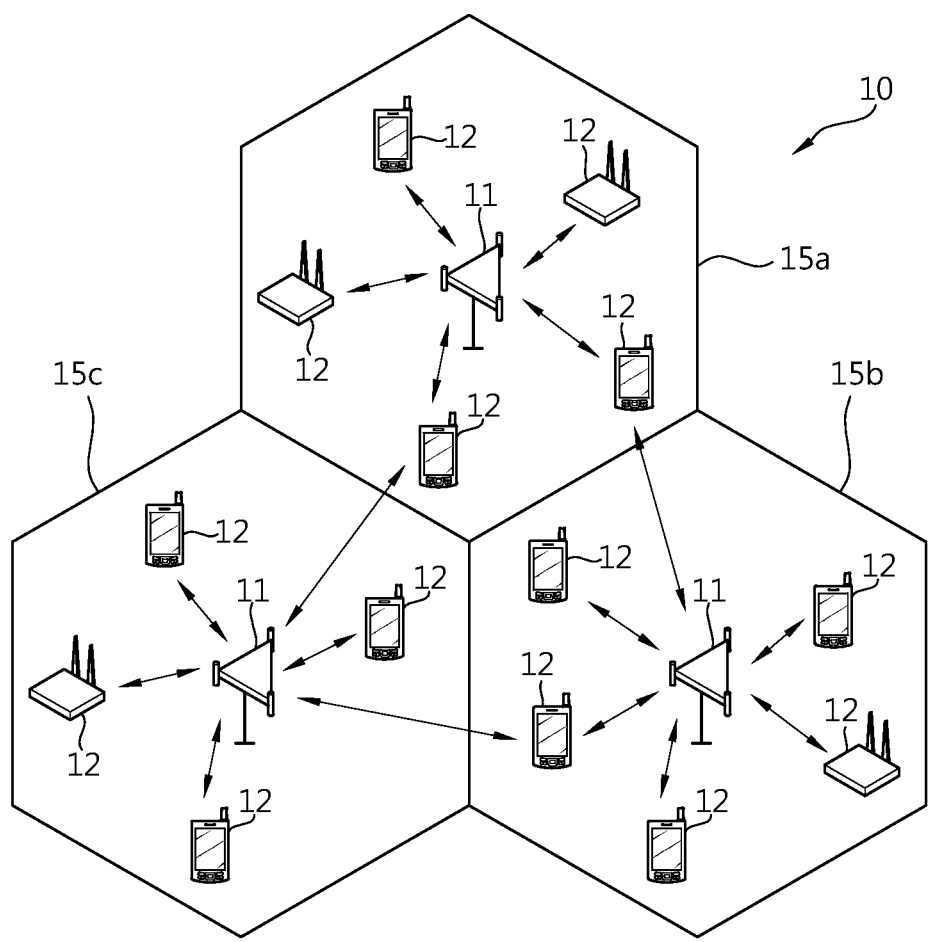
FIG. 1 is an example of a wireless communication system according to an embodiment of the present invention.

FIG. 1 is an example of a wireless communication system according to an embodiment of the present invention.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), an advanced BS (ABS), a base transceiver system (BTS), an access point, etc.

The UE belongs to one cell in general. A cell to which the UE belongs is called a serving cell. A BS which provides a communication service through the serving cell is called a serving BS. Since the wireless communication system is a cellular system, there is a different cell adjacent to the serving cell. The different cell adjacent to the serving cell is called a neighbor cell. A BS which provides a communication service to the adjacent cell is called a neighbor BS. The serving cell and the neighbor cell are determined relatively with respect to the UE.

This technique can be used for a downlink (DL) or an uplink (UL). In general, the DL implies communication from the BS 11 to the UE 12, and the UL implies communication from the UE 12 to the BS 11. In the DL, a transmitter may be a part of the BS 11, and a receiver may be a part of the UE 12. In the UL, a transmitter may be a part of the UE 12, and a receiver may be a part of the BS 11.

The wireless communication system may be any one of a multiple-input multiple-output (MIMO) system, a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

Hereinafter, the Tx antenna denotes a physical or logical antenna used for transmission of one signal or stream, and the Rx antenna denotes a physical or logical antenna used for reception of one signal or stream.

Figure 2:
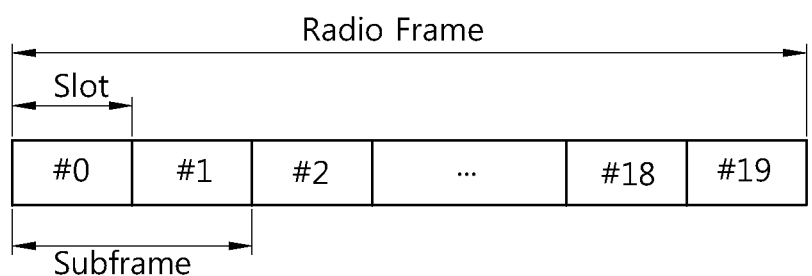
FIG. 2 shows a structure of a radio frame in $3^{rd}$ generation partnership project (3GPP) long term evolution (LTE).

FIG. 2 shows a structure of a radio frame in 3GPP LTE.

The section 5 of 3GPP (3rd Generation Partnership Project) TS 36.211 V8.2.0 (2008 March) "Technical Specification Group Radio Access Network; Evolved Universal Terrestrial Radio Access (E-UTRA); Physical channels and modulation (Release 8)" can be incorporated herein by reference. Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One slot includes a plurality of orthogonal frequency division multiplexing (OFDM) symbols in a time domain, and includes a plurality of subcarriers in a frequency domain. Since the 3GPP LTE uses OFDMA in a DL, the OFDM symbol is for representing one symbol period, and can be referred to as other terms according to a multiple-access scheme. For example, the OFDM symbol can also be referred to as an SC-FDMA symbol when SC-FDMA is used as a UL multiple-access scheme. A resource block (RB) is a resource allocation unit, and includes a plurality of consecutive subcarriers in one slot. The above radio frame structure is shown for exemplary purposes only. Thus, the number of subframes included in the radio frame or the number of slots included in the subframe or the number of OFDM symbols included in the slot may change variously.

In 3GPP LTE, it is defined such that one slot includes 7 OFDM symbols in a normal cyclic prefix (CP) and one slot includes 6 OFDM symbols in an extended CP.

Figure 3:
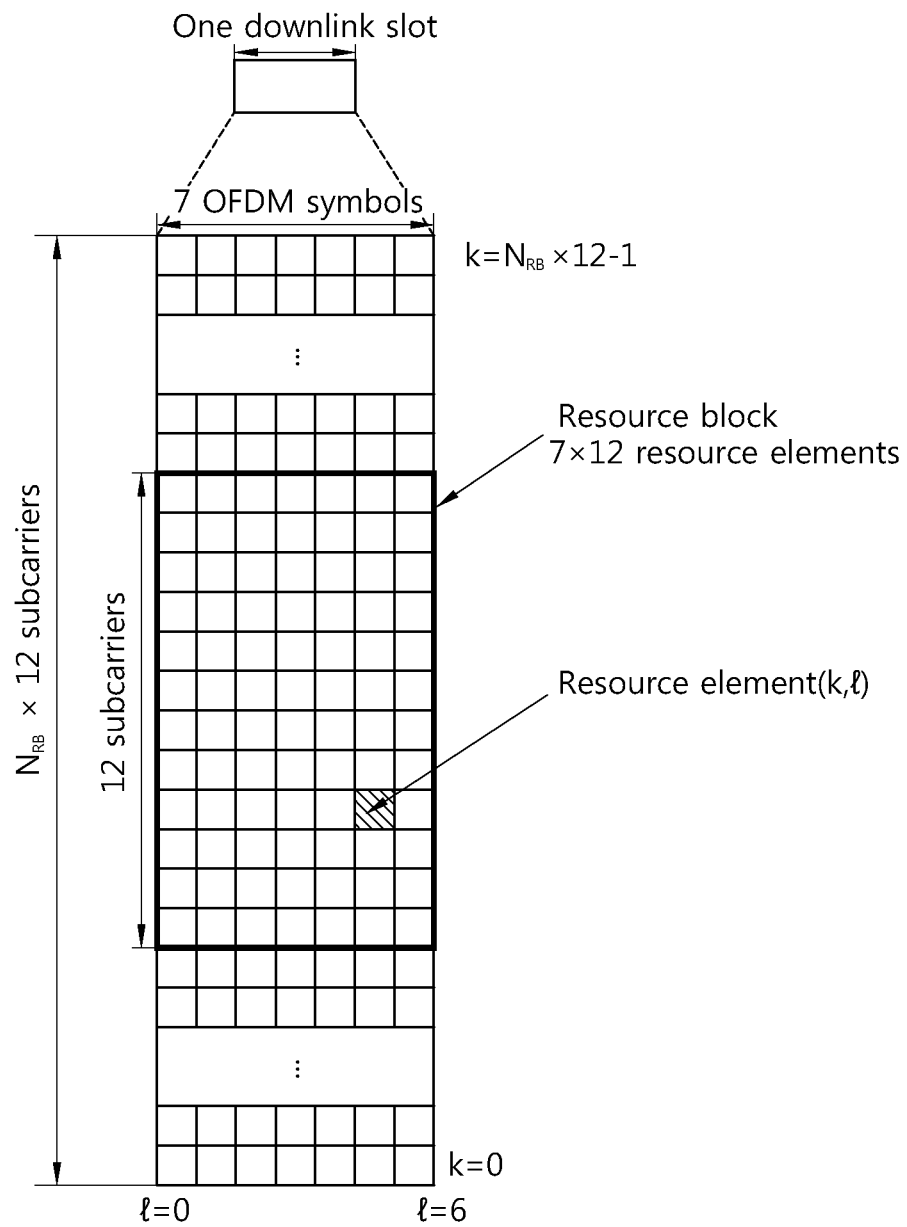
FIG. 3 shows an example of a resource grid for one downlink (DL) slot.

FIG. 3 shows an example of a resource grid for one DL slot.

A DL slot includes a plurality of OFDM symbols in a time domain, and includes a plurality of $N_{RB}$ resource blocks in a frequency domain. The number $N_{RB}$ of resource blocks included in the DL slot depends on a DL transmission bandwidth determined in a cell. For example, in an LTE system, $N_{RB}$ may be any one value in the range of 60 to 110. One resource block includes a plurality of subcarriers in the frequency domain. A UL slot may have the same structure as the DL slot.

Each element on the resource grid is referred to as a resource element. The resource element on the resource grid can be identified by an index pair (k, l) within the slot. Herein, k (k=0, . . . , $N_{RB}$×12−1) denotes a subcarrier index in the frequency domain, and l (l=0, . . . , 6) denotes an OFDM symbol index in the time domain.

Although it is described herein that one RB includes 7×12 resource elements consisting of 7 OFDM symbols in the time domain and 12 subcarriers in the frequency domain for example, the number of OFDM symbols and the number of subcarriers in the resource block are not limited thereto. Thus, the number of OFDM symbols and the number of subcarriers may change variously depending on a cyclic prefix (CP) length, a frequency spacing, etc. For example, when using a normal CP, the number of OFDM symbols is 7, and when using an extended CP, the number of OFDM symbols is 6. In one OFDM symbol, the number of subcarriers may be selected from 128, 256, 512, 1024, 1536, and 2048.

Figure 4:
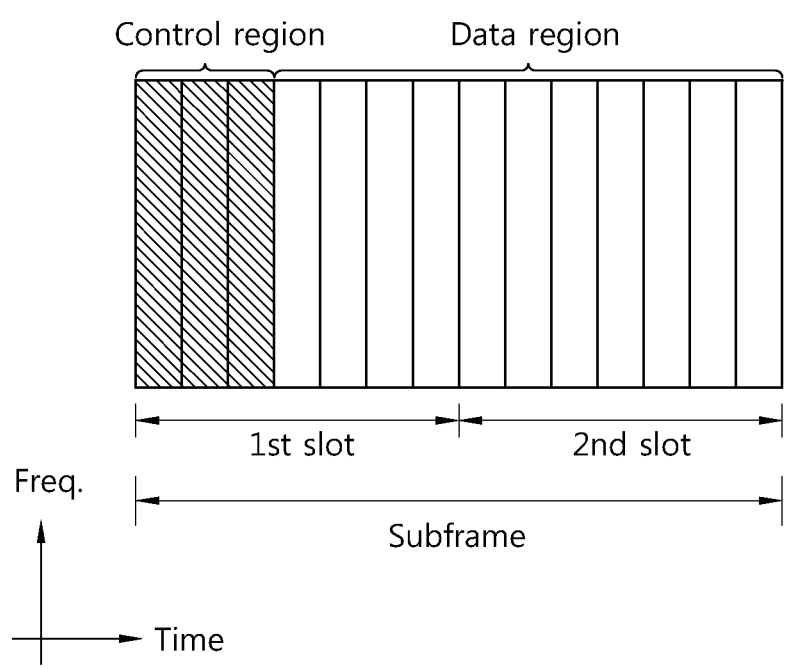
FIG. 4 shows a structure of a DL subframe.

FIG. 4 shows a structure of a DL subframe.

The DL subframe includes two slots in a time domain, and each slot includes 7 OFDM symbols in a normal CP. Up to three OFDM symbols (i.e., in case of 1.4 MHz bandwidth, up to 4 OFDM symbols) located in a front portion of a first slot within the subframe correspond to a control region, and the remaining OFDM symbols correspond to a data region. Herein, control channels are allocated to the control region, and a physical downlink shared channel (PDSCH) is allocated to the data region.

The PDCCH can carry a downlink shared channel (DL-SCH)'s resource allocation (referred to as a DL grant) and transmission format, uplink shared channel (UL-SCH)'s resource allocation information (referred to as a UL grant), paging information on a PCH, system information on a DL-SCH, a resource allocation of a higher layer control message such as a random access response transmitted through a PDSCH, a transmission power control command for individual UEs included in any UE group, activation of a voice over Internet (VoIP), etc. Control information transmitted through the PDCCH is referred to as downlink control information (DCI).

The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). An REG includes a plurality of resource elements (REs). A format of the PDCCH and the number of bits of the available PDCCH are determined according to a correlation between the number of CCEs and the coding rate provided by the CCEs.

A BS determines a PDCCH format according to a DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for a system information block (SIB), a system information identifier and a system information RNTI (SI-RNTI) may be masked to the CRC. To indicate a random access response which is a response for transmission of a random access preamble of the UE, a random access-RNTI (RA-RNTI) may be masked to the CRC.

The DCI on the PDCCH is received by using blind decoding. A plurality of candidate PDCCHs can be transmitted in the control region of one subframe. The UE monitors the plurality of candidate PDCCHs in every subframe. Herein, monitoring is an operation in which the UE attempts decoding of each PDCCH according to a to-be-monitored PDCCH format (more specifically, a DCI format). The UE monitors a set of PDCCH candidates in a subframe to find its own PDCCH. For example, if there is no cyclic redundancy check (CRC) error detected by performing de-making on an identifier (i.e., cell-radio network temporary identifier (RNTI)) of the UE in a corresponding PDCCH, the UE detects this PDCCH as a PDCCH having a DCI of the UE.

In the aforementioned process, the UE cannot know about a specific position in a control region in which its PDCCH is transmitted and about a specific CCE aggregation or DCI format used for PDCCH transmission. The 3GPP LTE uses a search space (SS) to reduce an overload caused by blind decoding. The SS can be called a monitoring set of CCEs for the PDCCH. The UE monitors the PDCCH within the SS. The SS is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A)

for carrying UE-specific information can also be transmitted in the common search space. The UE-specific search space supports a PDCCH having a CCE aggregation level of {1, 2, 4, 8}.

Figure 5:
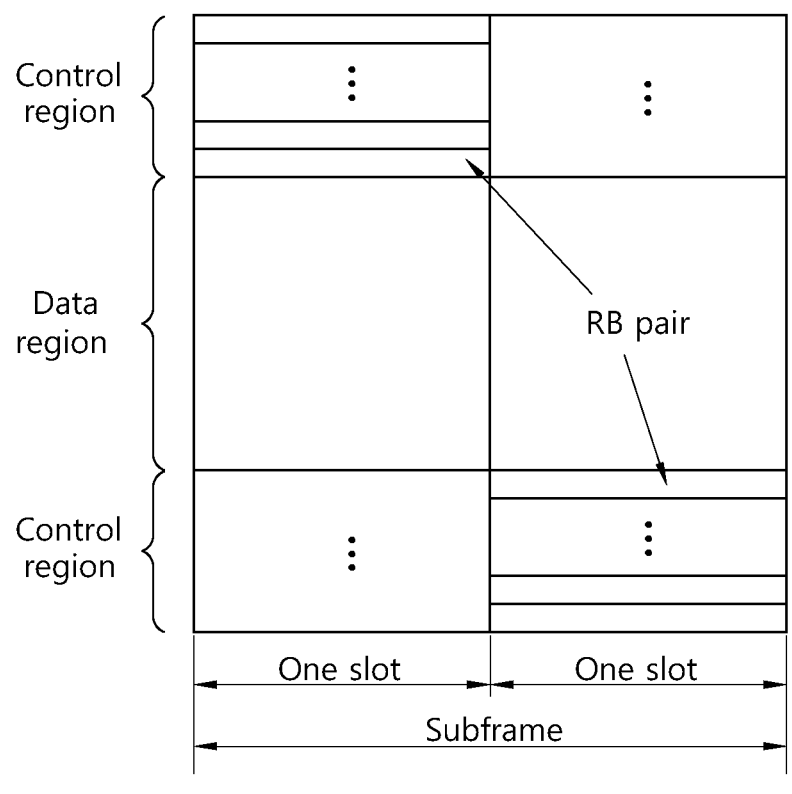
FIG. 5 shows a structure of an uplink (UL) subframe.

FIG. 5 shows a structure of a UL subframe.

The UL subframe can be divided into a control region and a data region in a frequency domain. A physical uplink control channel (PUCCH) for transmitting UL control information is allocated to the control region. A physical uplink shared channel (PUSCH) for transmitting data is allocated to the data region. To maintain a single-carrier property, a UE does not simultaneously transmit the PUCCH and the PUSCH.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped in a slot boundary. Since the UE transmits UL control information over time through different subcarriers, a frequency diversity gain can be obtained. m is a location index indicating a logical frequency domain location of the RB pair allocated to the PUCCH in the subframe.

Examples of UL control information transmitted on the PUCCH include hybrid automatic repeat request (HARQ) acknowledgement (ACK)/non-acknowledgment (NACK), a channel quality indicator (CQI) indicating a DL channel state, a scheduling request (SR) as a request for UL radio resource allocation, etc.

The PUSCH is mapped to an uplink shared channel (UL-SCH) which is a transport channel. UL data transmitted through the PUSCH may be a transport block which is a data block for the UL-SCH transmitted during a TTI. The transport block may be user information. Alternatively, the UL data may be multiplexed data. The multiplexed data may be obtained by multiplexing a transport block for the UL-SCH and control information. Examples of the control information multiplexed to the data may include a CQI, a precoding matrix indicator (PMI), HARQ, a rank indicator (RI), etc. Alternatively, the UL data may consist of only control information.

In the LTE-A system, an SC-FDMA transmission scheme is applied in a UL. SC-FDMA is a transmission scheme in which IFFT is performed after DFT spreading is performed. The SC-FDMA is also called DFT-spread OFDM (DFT-s OFDM). A peak-to-average power ratio (PAPR) or a cubic metric (CM) can be decreased in the SC-FDMA. When using the SC-FDMA transmission scheme, a non-linear distortion duration of a power amplifier can be avoided and thus transmit power efficiency can be increased in a UE in which power consumption is limited. Accordingly, a user throughput can be increased.

Meanwhile, a 3GPP LTE-A system supports a carrier aggregation system. 3GPP TR 36.815 V9.0.0 (2010-3) may be incorporated herein by reference to describe the carrier aggregation system.

The carrier aggregation system implies a system that configures a wideband by aggregating one or more carriers having a bandwidth smaller than that of a target broadband when the wireless communication system intends to support the wideband. The carrier aggregation system can also be referred to as other terms such as a multiple carrier system, a bandwidth aggregation system, or the like. The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous component carriers (CCs) and non-contiguous CCs are included.

In the contiguous carrier aggregation system, a guard band may exist between carriers. A carrier which is a target when aggregating one or more carriers can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a wideband of 20 MHz or higher by using only the bandwidth of the 3GPP LTE system. Alternatively, the wideband can be configured by defining a new bandwidth without having to directly use the bandwidth of the legacy system.

In the carrier aggregation system, a UE can transmit or receive one or a plurality of carriers simultaneously according to capacity. An LTE-A UE can transmit or receive a plurality of carriers simultaneously. An LTE Rel-8 UE can transmit or receive only one carrier when each of carriers constituting the carrier aggregation system is compatible with an LTE Rel-8 system. Therefore, when the number of carriers used in a UL is equal to the number of carriers used in a DL, it is necessary to configure such that all CCs are compatible with the LTE Rel-8 system.

In order to efficiently use a plurality of carriers, the plurality of carriers can be managed by media access control (MAC).

Figure 6:
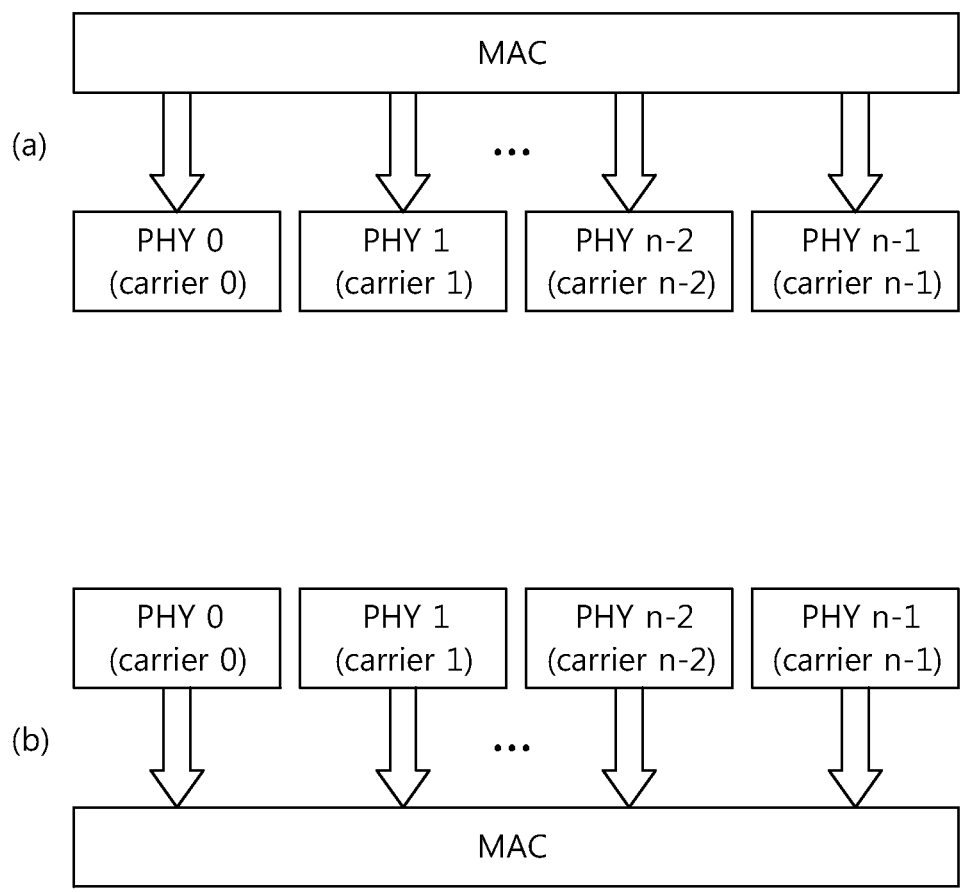
FIG. 6 shows an example of a base station (BS) and a user equipment (UE) which constitute a carrier aggregation system.

FIG. 6 shows an example of a BS and a UE which constitute a carrier aggregation system.

In the BS of FIG. 6(a), one MAC transmits and receives data by managing and operating all of n carriers. This is also applied to the UE of FIG. 6(b). From the perspective of the UE, one transport block and one HARQ entity may exist per CC. The UE can be scheduled simultaneously for a plurality of carriers. The carrier aggregation system of FIG. 6 can apply both to a contiguous carrier aggregation system and a non-contiguous carrier aggregation system. The respective carriers managed by one MAC do not have to be contiguous to each other, which results in flexibility in terms of resource management.

Figure 7:
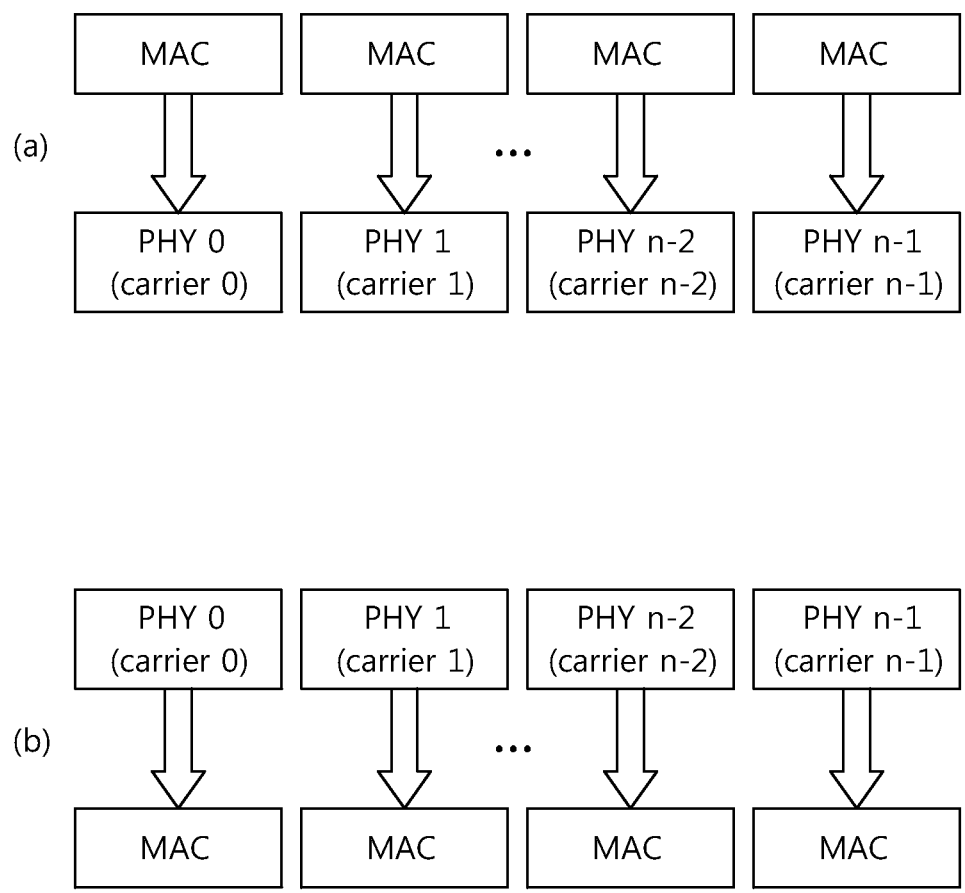
FIG. 7 and FIG. 8 show other examples of a BS and a UE which constitute a carrier aggregation system.
Figure 8:
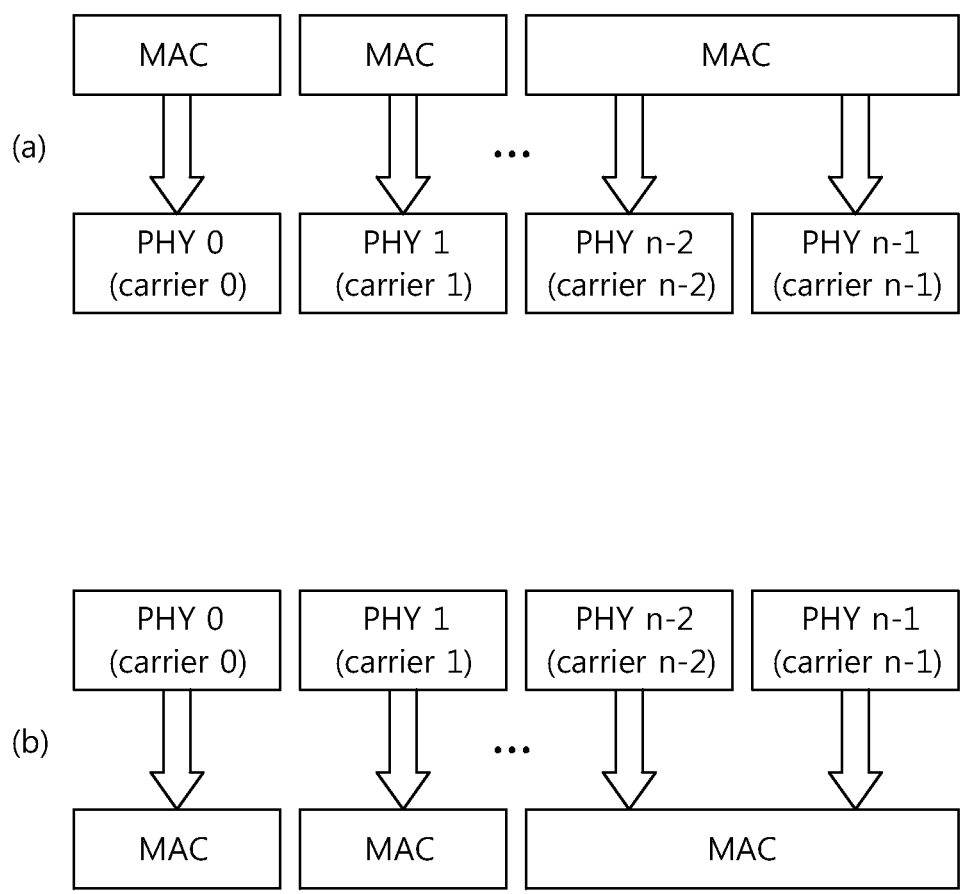

FIG. 7 and FIG. 8 show other examples of a BS and a UE which constitute a carrier aggregation system.

In the BS of FIG. 7(a) and the UE of FIG. 7(b), one MAC manages only one carrier. That is, the MAC and the carrier are 1:1 mapped. In the BS of FIG. 8(a) and the UE of FIG. 8(b), a MAC and a carrier are 1:1 mapped for some carriers, and regarding the remaining carriers, one MAC controls a plurality of carriers. That is, various combinations are possible based on a mapping relation between the MAC and the carrier.

The carrier aggregation system of FIG. 6 to FIG. 8 includes n carriers. The respective carriers may be contiguous to each other or may be separated from each other. The carrier aggregation system can apply both to a UL and a DL. In a TDD system, each carrier is configured to be able to perform UL transmission and DL transmission. In an FDD system, a plurality of carriers can be used by dividing them for a UL usage and a DL usage. In a typical TDD system, the number of CCs used in the UL is equal to that used in the DL, and each carrier has the same bandwidth. The FDD system can configure an asymmetric carrier aggregation system by allowing the number of carriers and the bandwidth to be different between the UL and the DL.

Figure 9:
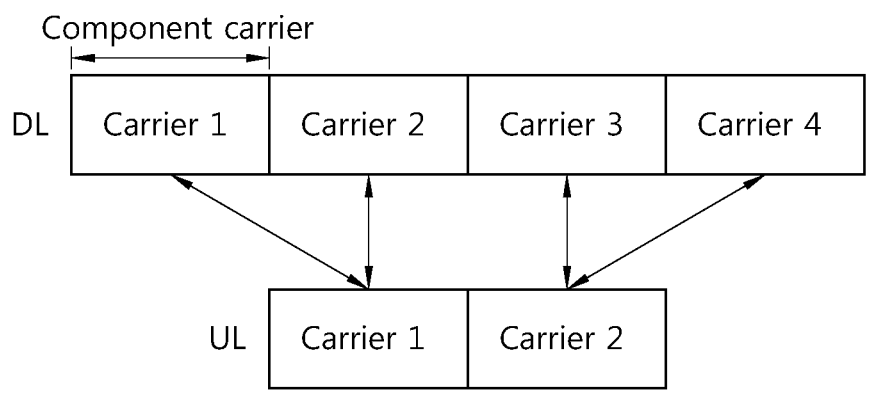
FIG. 9 is an example of a DL/UL asymmetric carrier aggregation system to which the present invention is applicable.
Figure 9:
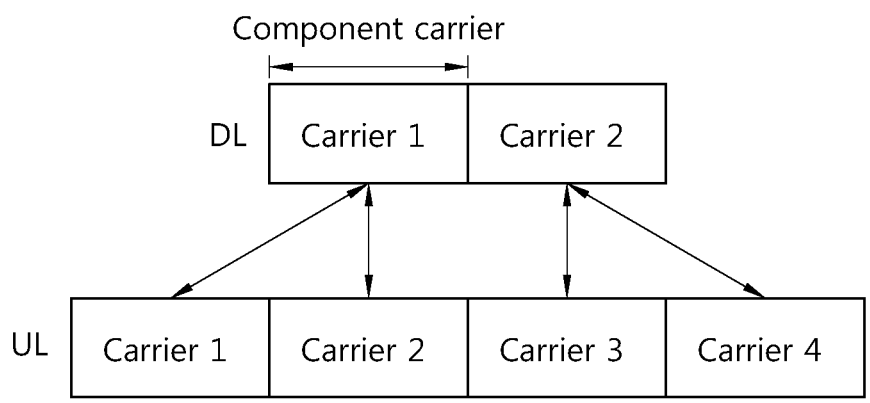

FIG. 9 is an example of a DL/UL asymmetric carrier aggregation system to which the present invention is applicable.

FIG. 9(a) shows a case where the number of DL CCs is greater than the number of UL CCs, and FIG. 9(b) shows a case where the number of UL CCs is greater than the number of DL CCs. Although FIG. 9(a) shows a case where two DL CCs are linked to one UL CC and FIG. 9(b) shows a case where one DL CC is linked to two UL CCs, the number of CCs constituting a DL and a UL and a linkage ratio of the DL CC and the UL CC can change variously according to a carrier aggregation system to which the present invention is applied, and the content proposed in the present invention can also apply to a symmetric carrier aggregation system in which a CC constituting the DL and a CC constituting the UL are 1:1 linked.

A carrier having backward compatibility in the LTE-A system is accessible by the conventional UE by considering compatibility with UEs of the conventional 3GPP LTE system, and can function as independent one carrier or as a part of carrier aggregation. The carrier having backward compatibility is always configured in a pair form of the DL and the UL in an FDD system. For this, a carrier not having backward compatibility is not accessible to the conventional UE since the carrier is newly defined without considering compatibility with UEs operating in the conventional LTE system. An extension carrier cannot function as one independent carrier, and is a carrier which functions as a part of a CC set including a carrier capable of functioning as one independent carrier.

In a carrier aggregation system, a cell-specific or/and UE-specific method can be taken into account as a form of using one or a plurality of carriers. In the following description of the present invention, the cell-specific method implies a carrier configuration from the perspective of any cell or BS and the UE-specific method implies a carrier configuration from the perspective of a UE.

The cell-specific carrier aggregation may have a form of carrier aggregation configured by any BS or cell. In case of an FDD system, a form of the cell-specific carrier aggregation may be a form in which a DL and UL linkage is determined according to a Tx-Rx separation specified in 3GPP LTE release-8/LTE-A. For example, a carrier frequency in the UL and the DL can be designated by an E-UTRA absolute radio frequency channel number (EARFCN) in the range 0 to 65535. The EARFCN and a carrier frequency in MHz unit for the DL may have a relation given by Equation 1 below.

$$F_{DL}=F_{DL\_low}+0.1(N_{DL}-N_{Offs-DL})$$ [Equation 1]

In Equation 1 above, $N_{DL}$ is a DL EARFCN, and $F_{DL\_low}$ and $N_{Offs-DL}$ are given by Table 1 below.

TABLE 1

| E-UTRA Operating Band | Downlink | | | Uplink | | |
|---|---|---|---|---|---|---|
| | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 1 | 2110 | 0 | 0-599 | 1920 | 18000 | 18000-18599 |
| 2 | 1930 | 600 | 600-1199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| 7 | 2620 | 2750 | 2750-3449 | 2500 | 20750 | 20750-21449 |
| 8 | 925 | 3450 | 3450-3799 | 880 | 21450 | 21450-21799 |
| 9 | 1844.9 | 3800 | 3800-4149 | 1749.9 | 21800 | 21800-22149 |
| 10 | 2110 | 4150 | 4150-4749 | 1710 | 22150 | 22150-22749 |
| 11 | 1475.9 | 4750 | 4750-4999 | 1427.9 | 22750 | 22750-22999 |
| 12 | 728 | 5000 | 5000-5179 | 698 | 23000 | 23000-23179 |
| 13 | 746 | 5180 | 5180-5279 | 777 | 23180 | 23180-23279 |
| 14 | 758 | 5280 | 5280-5379 | 788 | 23280 | 23280-23379 |
| ... | | | | | | |
| 17 | 734 | 5730 | 5730-5849 | 704 | 23730 | 23730-23849 |
| ... | | | | | | |
| 33 | 1900 | 26000 | 36000-36199 | 1900 | 36000 | 36000-36199 |
| 34 | 2010 | 26200 | 36200-36349 | 2010 | 36200 | 36200-36349 |
| 35 | 1850 | 26350 | 36350-36949 | 1850 | 36350 | 36350-36949 |
| 36 | 1930 | 26950 | 36950-37549 | 1930 | 36950 | 36950-37549 |
| 37 | 1910 | 27550 | 37550-37749 | 1910 | 37550 | 37550-37749 |
| 38 | 2570 | 27750 | 37750-38249 | 2570 | 37750 | 37750-38249 |
| 39 | 1880 | 28250 | 38250-38649 | 1880 | 38250 | 38250-38649 |
| 40 | 2300 | 28650 | 38650-39649 | 2300 | 38650 | 38650-39649 |

NOTE:
The channel numbers that designate carrier frequencies so close to the operating band edges that the carrier extends beyond the operating band edge shall not be used. This implies that the first 7, 15, 25, 50, 75 and 100 channel numbers at the lower operating band edge and the last 6, 14, 24, 49, 74 and 99 channel numbers at the upper operating band edge shall not be used for channel bandwidths of 1.4, 3, 5, 10, 15 and 20 MHz respectively.

An E-UTRA transmission channel (carrier centre frequency) to reception channel (carrier centre frequency) separation based on transmission and reception channel bandwidths can be defined by Table 2 below.

TABLE 2

| Frequency Band | TX - RX carrier centre frequency separation |
|---|---|
| 1 | 190 MHz |
| 2 | 80 MHz. |
| 3 | 95 MHz. |
| 4 | 400 MHz |
| 5 | 45 MHz |
| 6 | 45 MHz |
| 7 | 120 MHz |
| 8 | 45 MHz |
| 9 | 95 MHz |

TABLE 2-continued

| Frequency Band | TX - RX carrier centre frequency separation |
|---|---|
| 10 | 400 MHz |
| 11 | 48 MHz |
| 12 | 30 MHz |
| 13 | −31 MHz |
| 14 | −30 MHz |
| 17 | 30 MHz |

For details related to the above description, the section 5.7 of 3GPP TS 36.101 V8.4.0 released in December 2008 can be incorporated by reference.

Now, a UE-specific carrier aggregation that can be used in a carrier aggregation system will be described. The UE-specific carrier aggregation is an operation of configuring a (component) carrier set that can be used by a specific UE or a specific UE group by using any method, for example, UE capability, signaling, etc., between a BS and a UE.

A UE-specific DL CC set can be defined as a set of DL CCs scheduled to receive a DL data channel (i.e., PDSCH) configured through dedicated signaling with respect to a specific UE. A UE-specific UL CC set can be defined as a set of UL CCs scheduled to transmit a UL data channel (i.e., PUSCH).

In the carrier aggregation system, a PDCCH monitoring CC set implies a set of CCs for monitoring a PDCCH, that is, a control channel for transmitting control information by a specific UE. The PUCCH monitoring CC set may be a DL CC included in a UE-specific DL CC set, or may be a DL CC which includes a part of the UE-specific DL CC or which is not included in the UE-specific DL CC set. The PDCCH monitoring CC set can be configured in a UE-specific or cell-specific manner.

Cross-carrier scheduling is a scheduling method capable of performing resource allocation of a PDSCH transmitted by using a different carrier through a PDCCH transmitted through a specific CC and/or resource allocation of a PUSCH transmitted by using another CC other than a CC basically linked to the specific CC. That is, the PDCCH and the PDSCH can be transmitted through different DL CCs, and the PUSCH can be transmitted through a UL CC other than a UL CC linked to a DL CC on which a PDCCH including a UL grant is transmitted. As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF).

A system supporting cross-carrier scheduling may include the CIF in the existing DCI format. The system supporting cross-carrier scheduling may be an LTE-A system in which the CIF is added to the existing format (i.e., a DCI format used in LTE), and thus one to three bits can be extended, and a PDCCH structure can reuse the existing coding scheme, resource allocation scheme (i.e., CCE-based resource mapping), etc.

The system supporting cross-carrier scheduling can also support non cross-carrier scheduling. The non cross-carrier scheduling is a scheduling scheme in which resource allocation of a PDSCH of the same CC is performed through a PDCCH transmitted through a specific CC, and resource allocation of a PUSCH transmitted through one CC linked to the specific CC is performed. The CIF may not be included in case of the non cross-carrier scheduling. That is, the existing PDCCH structure and the DCI format can be reused.

A BS can semi-statically configure whether the cross-carrier scheduling is activated. That is, the BS can semi-statically configure whether the CIF is included in the DCI format, and can configure it in a UE (or UE group) specific or cell specific manner. According to the semi-static configuration, a signaling overhead between the BS and the UE can be decreased.

Now, a cross-carrier scheduling scheme in a UL will be described according to the present invention.

The aforementioned cross-carrier scheduling can be classified into DL cross-carrier scheduling and UL cross-carrier scheduling. The DL cross-carrier scheduling implies a case where a CC for transmitting a PDCCH including resource allocation information for PDSCH transmission and other information is different from a CC for transmitting a PDSCH. The UL cross-carrier scheduling implies a case where a CC for transmitting a PDCCH including a UL grant for PUSCH transmission is different from a DL CC linked to a UL CC for transmitting a PUSCH.

Figure 10:
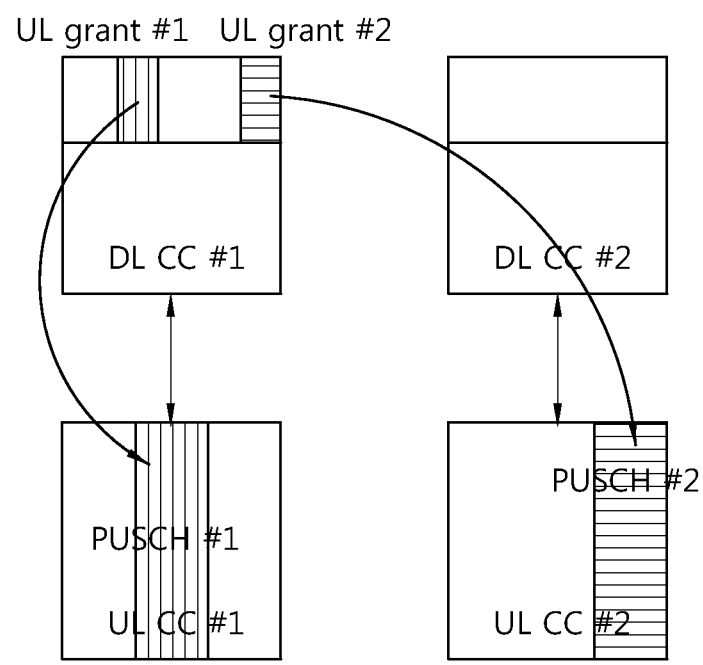
FIG. 10 shows UL cross-carrier scheduling.

FIG. 10 shows UL cross-carrier scheduling.

Referring to FIG. 10, a DL CC#1 is linked to a UL CC#1, and a DL CC#2 is linked to a UL CC#2. When assuming such a link relation, transmission of only a UL grant#1 for PUSCH #1 transmission of the UL CC#1 through the DL CC#1 is UL non cross-carrier scheduling. On the other hand, transmission of a UL grant#2 for PUSCH #2 transmission of the UL CC#2 through the DL CC#1 is UL cross-carrier scheduling.

Such a UL cross-carrier scheduling may be necessary to decrease the number of blind decoding attempts of a UE. That is, when a UL grant is transmitted through a plurality of DL CCs, the UE must perform blind decoding for detecting a UL grant (e.g., a DCI format 0) with respect to each DL CC. However, if the UL grant is transmitted through only a part of the plurality of DL CCs, for example, through only one DL CC, it is enough for the UE to perform blind decoding only for one DL CC, and thus the number of blind decoding attempts can be decreased.

When applying the UL cross-carrier scheduling, it may be necessary to consider how to configure a set of UL CCs (hereinafter, referred to as a UL CC set) configured such that a UE can transmit UL data to a BS. The UL CC set can be configured in a UE specific or cell specific manner. A method of configuring the UL CC set will be first described.

Figure 11:
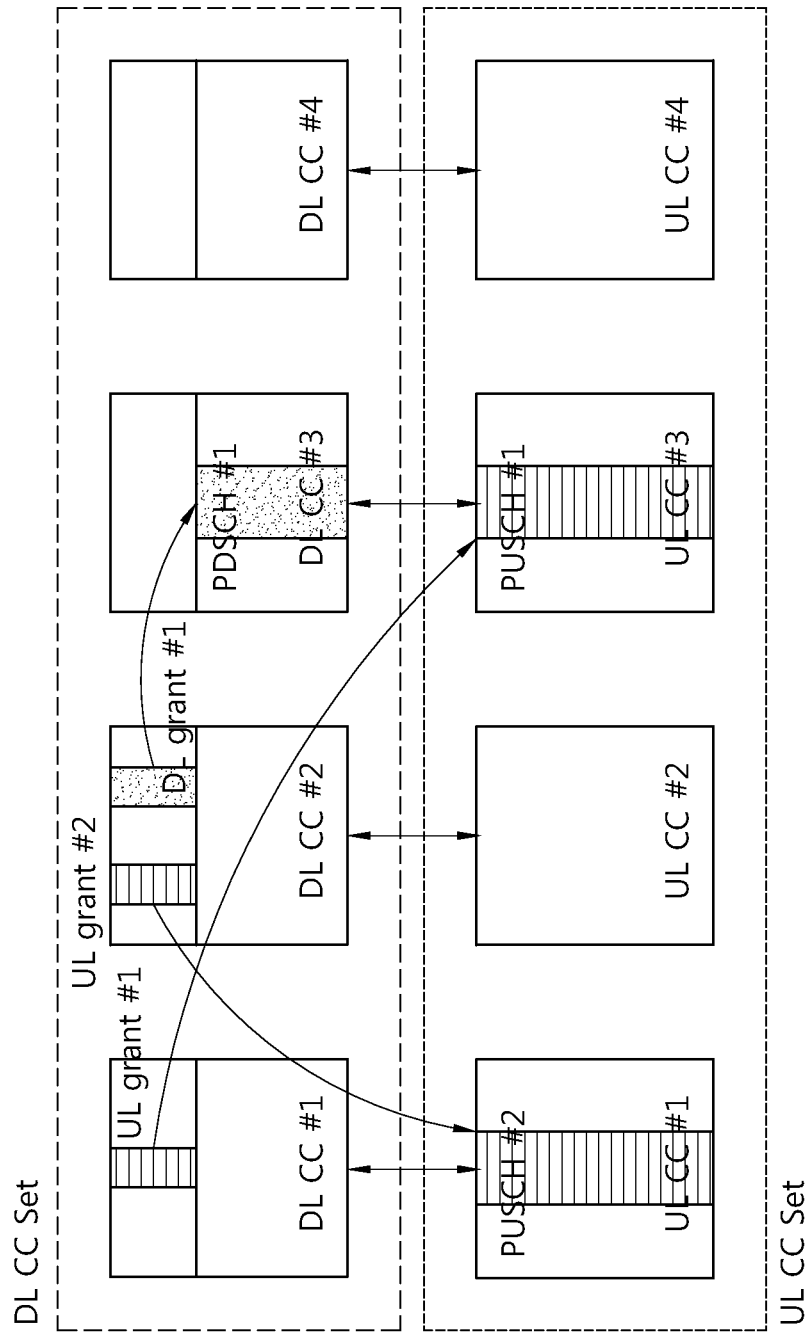
FIG. 11 shows a first example of a UL component carrier (CC) set configuration.

FIG. 11 shows a first example of a UL CC set configuration.

Referring to FIG. 11, a DL CC set for a UE may include a DL CC#1 to a DL CC#4. Assume that a UL CC#N is linked to a DL CC#N (where N is any one of natural numbers 1 to 4). In this case, if any DL CC included in the DL CC set can transmit a UL grant for any UL CC irrespective of a link, the UL CC set can include all UL CCs linked to the respective DL CCs. For example, if some or all of the UL CC#2 to the UL CC#4 can be scheduled instead of limiting to a UL CC#1 to which the DL CC#1 is linked, the UL CC set can be configured to include all of the UL CC#1 to the UL CC#4. That is, the UL CC set can be configured with a set of UL CCs linked to respective DL CCs included in a DL CC set.

Figure 12:
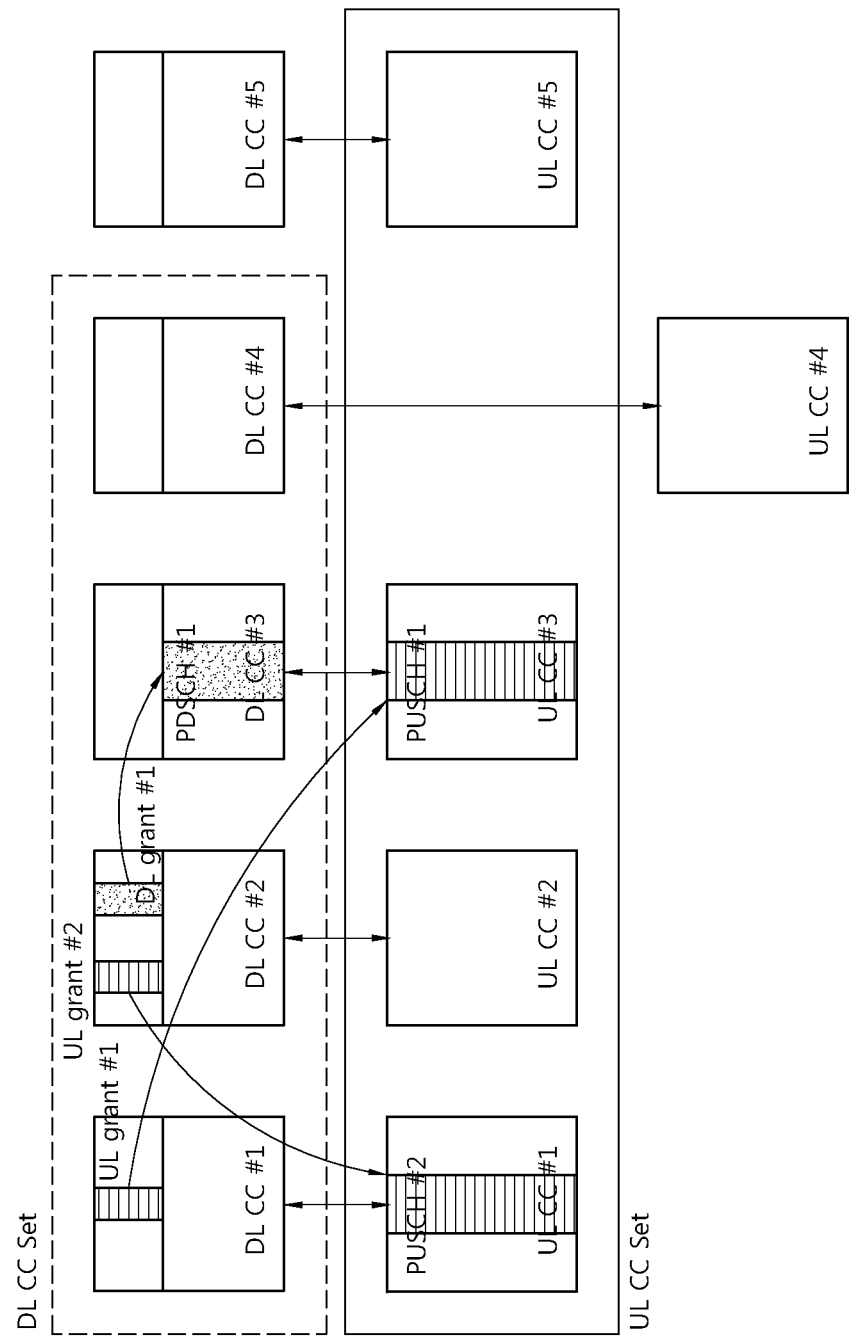
FIG. 12 shows a second example of a UL CC set configuration.

FIG. 12 shows a second example of a UL CC set configuration.

Referring to FIG. 12, a UL CC set can include a UL CC linked to a DL CC other than a DL CC included in a DL CC set. That is, a UL CC#5 is linked to a DL CC#5, whereas the DL CC#5 is a DL CC not included in the DL CC set. In addition, not all of UL CCs linked to DL CCs included in the DL CC set are included in the UL CC set. That is, a UL CC#4 linked to a DL CC#4 is not included in the UL CC set.

Figure 13:
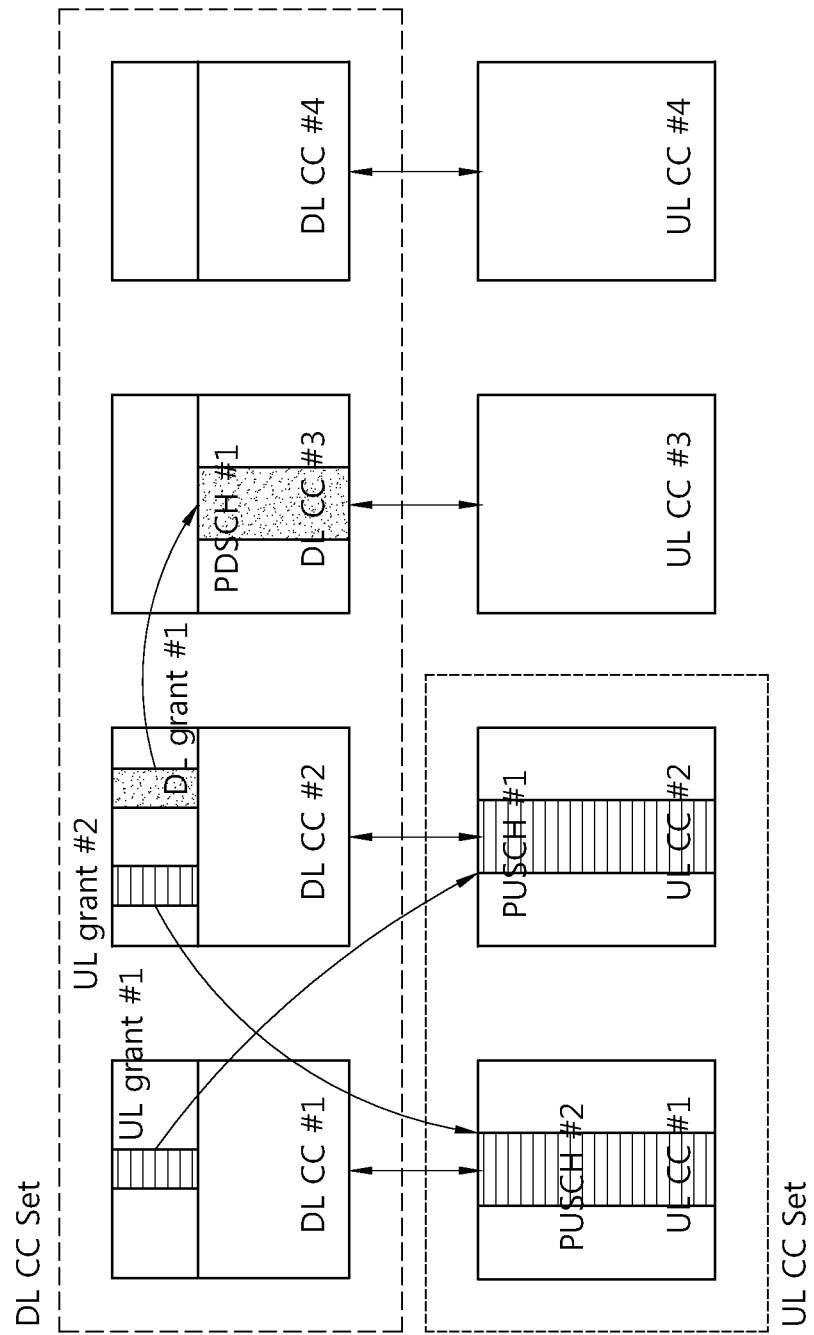
FIG. 13 shows a third example of a UL CC set configuration.

FIG. 13 shows a third example of a UL CC set configuration.

Referring to FIG. 13, DL CCs included in a DL CC set are a DL CC#1 to a DL CC#4. It is assumed that a UL CC#N is linked to a DL CC#N (where N is any one of natural numbers 1 to 4). In this case, a UL CC set may include only a UL CC#1 and a UL CC#2. That is, the UL CC set can be configured with only some of UL CCs linked to respective DL CCs included in a DL CC set.

Figure 14:
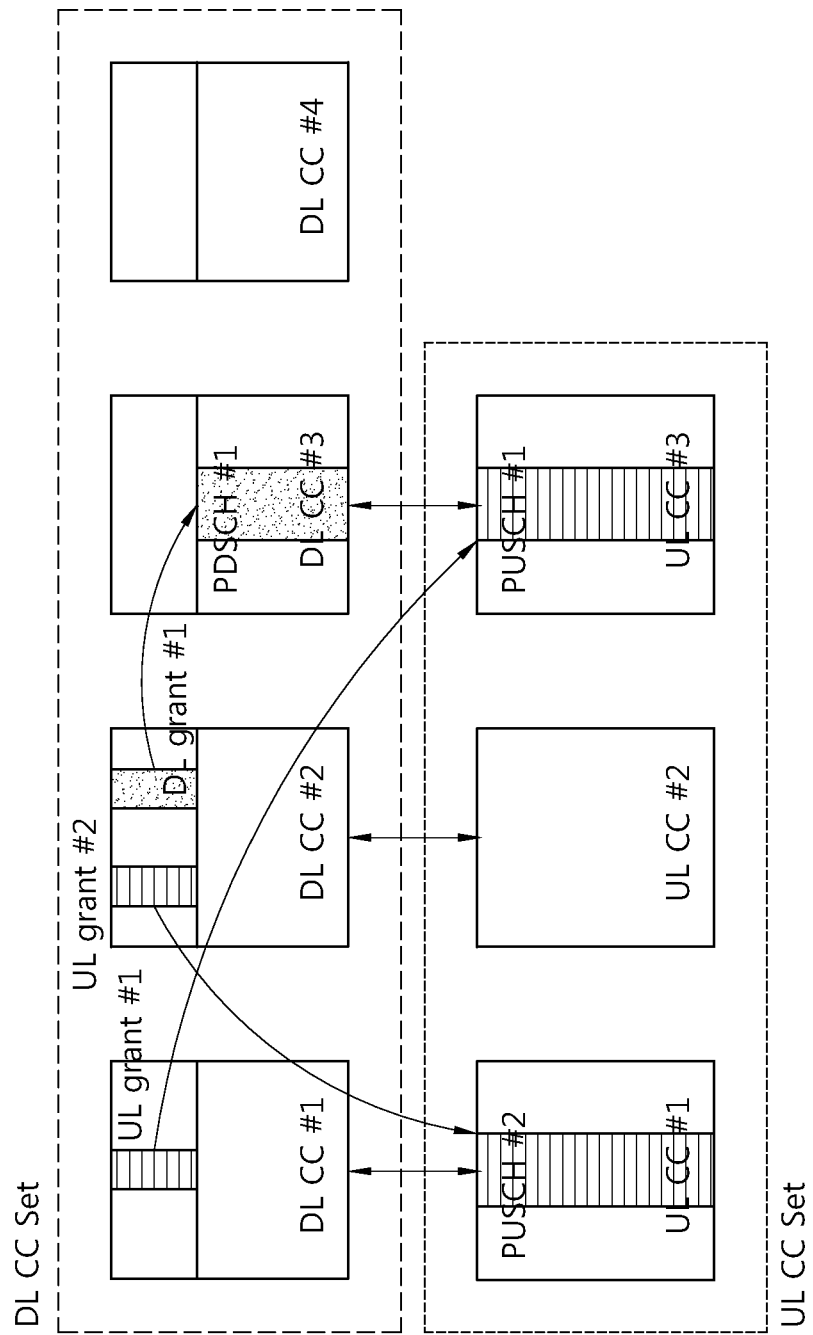
FIG. 14 shows a fourth example of a UL CC set configuration.

FIG. 14 shows a fourth example of a UL CC set configuration.

Referring to FIG. 14, a DL CC set includes a DL CC#1 to a DL CC#4. Among them, the DL CC#4 has no link relation with a UL CC. That is, the DL CC#4 is a DL CC not constituting a link pair with the UL CC. As such, when there is a special DL CC not having a link relation with the UL CC among DL CCs included in the DL CC set, the UL CC set can be configured with only UL CCs having a link relation with a DL CC. Therefore, the number of CCs included in the DL CC set may be different from the number of CCs included in the UL CC set, and in this case, the DL CC set and the UL CC set have a different size to each other.

Although a case where the size of the DL CC set is great is described in the above example, there may be an opposite case, that is, a case where the size of the UL CC set is greater. For example, if there is a special UL CC not having a link relation with a DL CC among UL CCs included in the UL CC set, the size of the UL CC set may be greater than the size of the DL CC set.

The aforementioned first to fourth examples of the UL CC set configuration can be used through any combination.

Figure 15:
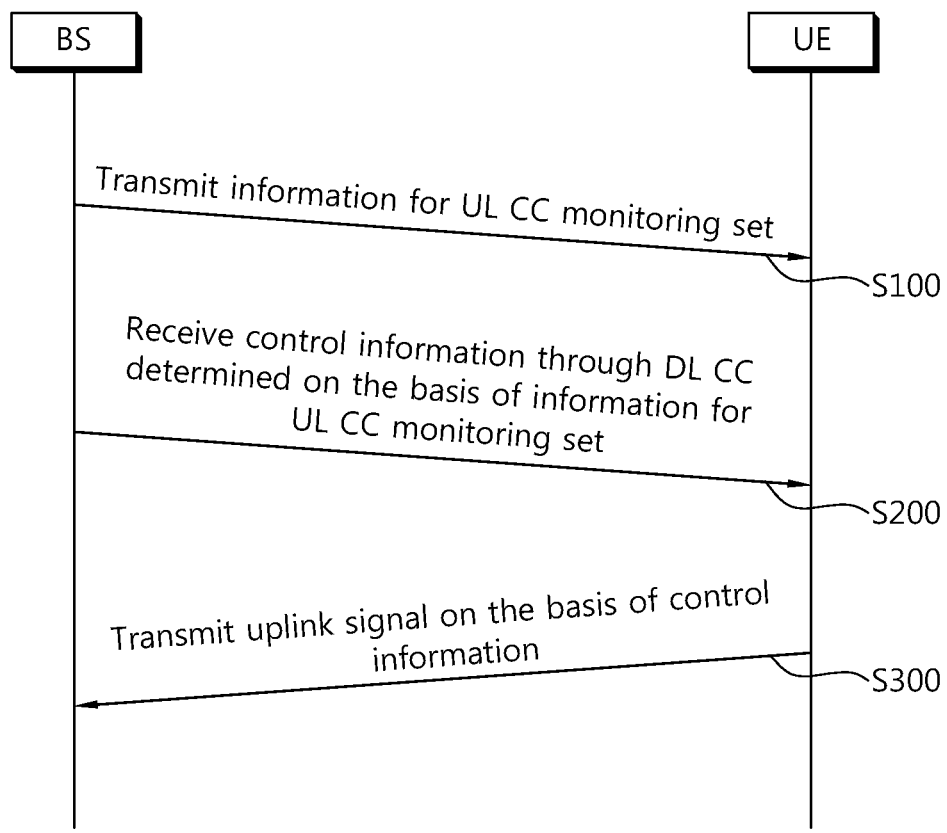
FIG. 15 shows a UL cross-scheduling method according to an embodiment of the present invention.

FIG. 15 shows a UL cross-scheduling method according to an embodiment of the present invention.

Referring to FIG. 15, a UE receives information for a UL CC monitoring set from a BS (step S100). The UL CC monitoring set implies a set of DL CCs to be monitored by the UE to detect a UL grant that is, control information for PUSCH transmission of the UE. A UL CC on which the UE transmits a PUSCH may be any one of the aforementioned UL CC sets. Which method will be used among the aforementioned methods of configuring UL CC sets can be defined between the BS and the UE, or can be reported by the BS to the UE through signaling.

A UL CC monitoring set can be configured to be identical to a DL CC monitoring set. Herein, the DL CC monitoring set is a set of DL CCs for performing blind decoding to detect DL control information by the UE with respect to a DL CC. The DL CC monitoring set can be configured with a subset of a DL CC set assigned to the UE. If the UE performs blind decoding with respect to the entirety of the DL CC set, the number of blind decoding attempts can be excessively increased. Therefore, monitoring is performed only for some of DL CCs of the DL CC set.

When the UL CC monitoring set is identical to the DL CC monitoring set, the BS can explicitly report an indicator indicating whether the UL CC monitoring set is identical to the DL CC monitoring set to the UE through a physical layer signal (i.e., an L1 signal) or a higher layer signal (e.g., an RRC message).

The UL CC monitoring set can be set to be different from the predetermined DL CC monitoring set. For example, the UL CC monitoring set may include only some of DL CCs included in the DL CC monitoring set as a subset of DL CCs included in the DL CC set or may not include the DL CCs at all (that is, the DL CC monitoring set and the UL CC monitoring set may be exclusive to each other). In case of a DL CC included in both the DL CC monitoring set and the UL CC monitoring set, the UE must include not only DCI format for a PDSCH but also DCI formats including UL grant information for PUSCH transmission into a blind decoding target.

If the UL CC monitoring set is different from the DL CC monitoring set, the BS can transmit information for the UL CC monitoring set through a physical layer signal (i.e., L1 signal) or a higher layer signal (i.e., RRC message) and thus can report to the UE the UL CC monitoring set. In this case, the BS can indicate a DL CC used as the UL CC monitoring set among DL CCs included in the DL CC set in a bitmap format. For example, if a DL CC#2 is a UL CC monitoring set among a DL CC#1 to a DL CC#4, it can be reported by transmitting a value '0100' as a bitmap.

Alternatively, the BS can indicate the number of DL CCs included in the UL CC monitoring or a CC index with respect to a lowest CC index among the DL CCs included in the DL CC set. For example, assume that the DL CC set includes the DL CC#1 to the DL CC#4, and the DL CC#1, the DL CC#2, the DL CC#3, and the DL CC#4 respectively have CC indices 0, 1, 2, and 3. In this case, if the UL CC monitoring set includes the DL CC#1 and the DL CC#2, the BS can give information indicating that two DL CCs are included in the UL CC monitoring set with respect to the CC index 0. Then, the UE can interpret that the DL CC#1 and the DL CC#2 are the UL CC monitoring set with respect to the CC index 0. Alternatively, the BS can directly indicate indices of DL CCs included in the UL CC monitoring set. That is, when the BS indicates the DL CC included in the UL CC monitoring set, the BS can indicate only a difference with the DL CC monitoring set which has already been shared between the BS and the UE. In this case, regarding a case where some of DL CCs in the DL CC monitoring set are used as the UL CC monitoring set, a DL CC included in the UL CC monitoring set can be indicated in a bitmap format.

When the UL CC monitoring set has a larger size than the DL CC monitoring set, a DL CC included in the UL CC monitoring set can be indicated in the bitmap format among DL CCs not included in the DL CC monitoring set.

Alternatively, if the UL CC monitoring set has the larger size than the DL CC monitoring set, the number of DL CCs that can be included in the UL CC monitoring set can be indicated with respect to a lowest (or highest) CC index among DL CCs not included in the DL CC monitoring set.

Referring back to FIG. 15, the UE receives control information through a DL CC determined based on information for the UL CC monitoring set from the BS (step S200). The control information may include a UL grant for PUSCH transmission of the UE. The UE transmits a UL signal to the BS on the basis of the control information (step S300).

Hereinafter, a method of determining whether a CIF field is included will be described when a UE detects UL control information in a DL CC included in a UL CC monitoring set. In other words, it is about how to determine whether to activate the CIF field in the DL CC included in the UL CC monitoring set. This can be related to how to determine whether a CIF is included when detecting DCI for PUSCH transmission in the DL CC included in the UL CC monitoring set. A DL case will be first described to explain a UL case.

In the DL case, as an implicit method, a CIF can be automatically activated or deactivated when a BS determines a DL CC set and a DL CC monitoring set. For example, a specific DL CC set and DL CC monitoring set for activating the CIF can be pre-defined between the BS and the UE, and the UE can implicitly know whether the CIF field is activated/deactivated according to whether an assigned DL CC set or DL CC monitoring set corresponds to the specific DL CC set or DL CC monitoring set.

Alternatively, as an explicit method for the DL case, the BS may provide the UE with information indicating that a CIF of a specific CC is activated through L1 or RRC signaling before transmitting a PDCCH including the CIF, or may provide the UE with information indicating that the CIF is deactivated through L1 or RRC signaling according to a determination that cross-carrier scheduling through the CIF is no longer necessary.

As described above, when whether to activate the CIF field is determined implicitly or explicitly for the DL case, whether to activate the CIF field for the UL case can be determined by using the implicit or explicit method.

For example, the implicit method is a method in which, when the CIF is activated for the DL, the CIF is also activated for the UL, and when the CIF is deactivated for the DL, the CIF is also deactivated for the UL. That is, this is a method in which whether the CIF is activated in a DCI format for the UL is determined according to whether the CIF is activated in a DCI format for the DL.

For example, the explicit method is a method in which the BS explicitly reports an activation of a UL CIF to the UE through L1 or RRC signaling k subframes before a subframe in which a UL grant is transmitted to perform cross-carrier scheduling. Likewise, the BS can explicitly report a deactivation of the UL CIF to the UE through L1 or RRC signaling k subframes before a subframe in which a UL grant is transmitted to perform non cross-carrier scheduling. For example, upon receiving activation/deactivation information of the CIF in an $(n-k)^{th}$ subframe, the UE can decode a PDCCH by considering the activation/deactivation of the CIF (i.e., by considering whether the CIF is included/not-included) when detecting UL control information from an $n^{th}$ subframe. For example, k may be 4 which is a basic unit of performing synchronous HARQ in LTE Rel-8 FDD.

According to the present invention, cross-carrier scheduling can be independently applied to the DL and the UL. For example, the cross-carrier scheduling may be applied to the DL and may not be applied to the UL. UL/DL independent cross-carrier scheduling can be applied, for example, in a case where a UL CC set includes only one UL CC.

Figure 16:
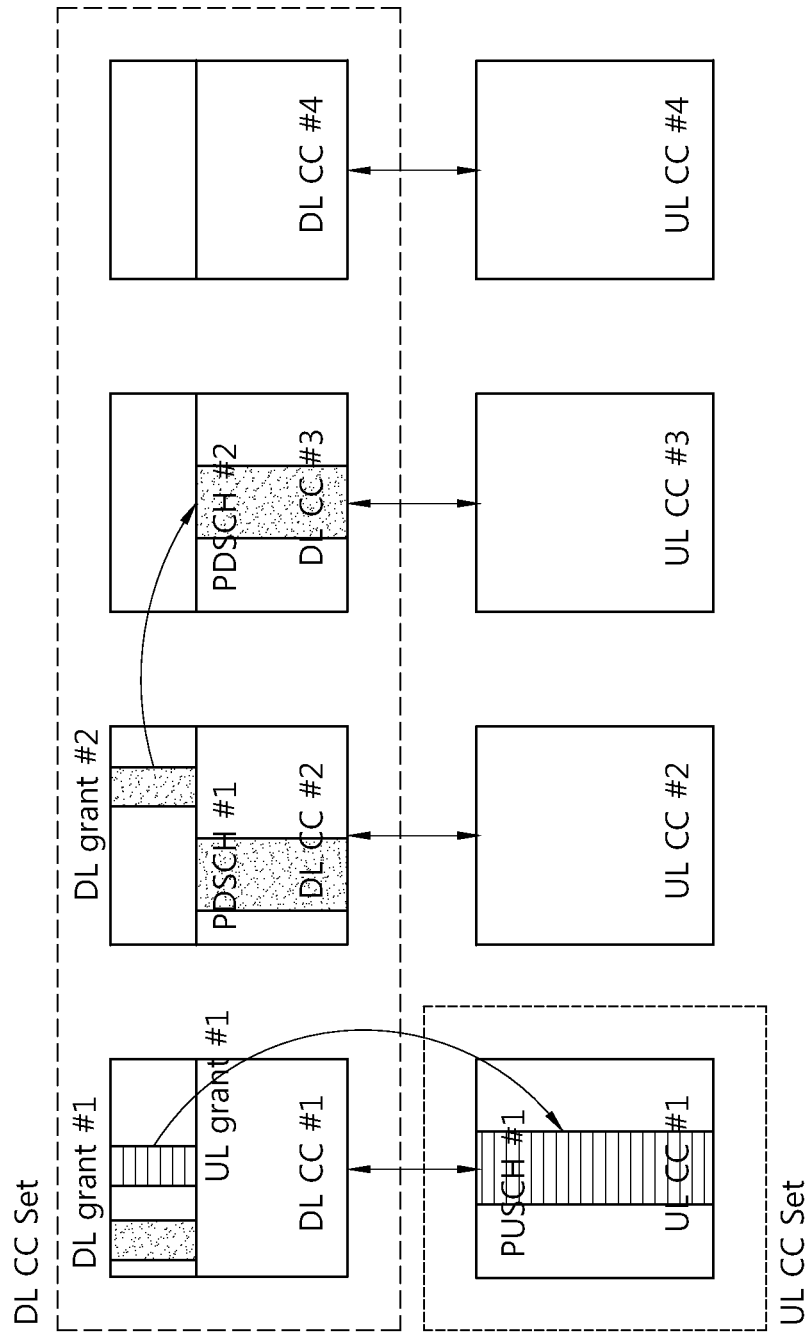
FIG. 16 shows an example of a case where a UL CC set includes only one UL CC.

FIG. 16 shows an example of a case where a UL CC set includes only one UL CC.

Referring to FIG. 16, a DL CC set includes four DL CCs, i.e., a DL CC#1 to a DL CC#4, and a UL CC set includes only a UL CC#1. As such, when the UL CC set includes only one UL CC, cross-carrier scheduling may not be performed in a UL even if cross-carrier scheduling is performed in a DL. This case is advantageous, for example, when an amount of data to be transmitted by a UE in the UL is less than that in the DL. Then, since cross-carrier scheduling is not performed in the UL from the perspective of the UE, there is an advantage in that the number of blind decoding attempts for detecting a PDCCH including a UL grant can be decreased. That is, in the above example, the UE can detect a UL grant for a UL CC#1 by performing blind decoding only on the DL CC#1.

Figure 17:
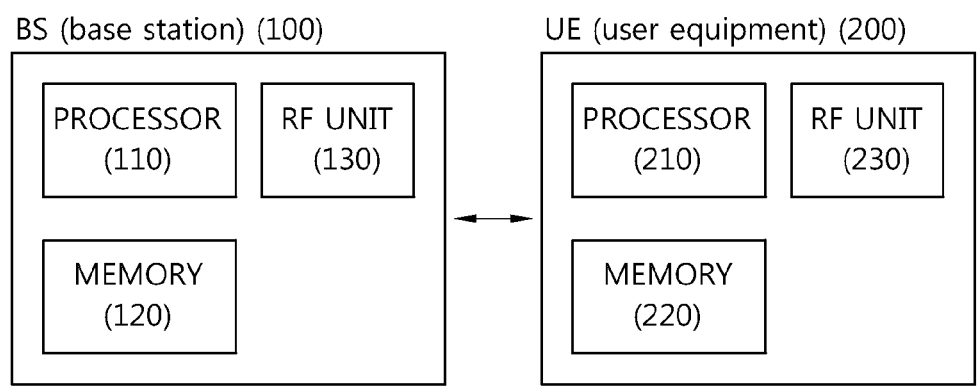
FIG. 17 is a block diagram showing a BS and a UE.

FIG. 17 is a block diagram showing a BS and a UE.

A BS 100 includes a processor 110, a memory 120, an a radio frequency (RF) unit 130. The processor 110 implements the proposed functions, procedures, and/or methods. For example, information for a UL CC monitoring set can be reported to a UE through a higher layer signal (e.g., RRC) or a physical layer signal. In addition, UL control information can be transmitted to the UE through a DL CC determined based on the information for the UL CC monitoring set. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, the processor 210 receives information for a UL CC monitoring set from the BS, and transmits UL signal to the BS after receiving control information through a DL CC determined based on the received information. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, and/or a data processing unit. The memory 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. An uplink cross-carrier scheduling method in a carrier aggregation system, the method performed by a user equipment (UE) and comprising:
    receiving uplink component carrier (UL CC) monitoring set information and downlink component carrier (DL CC) monitoring set information from a base station,
    wherein the UL CC monitoring set information is an indication of a first set of DL CCs on which the UE performs blind decoding to detect a first downlink control information (DCI) used for assigning physical uplink shared channel (PUSCH) resources and the DL CC monitoring set information is an indication of a second set of the DL CCs on which the UE performs blind decoding to detect a second DCI having a different format than the first DCI, used for assigning a physical downlink shared channel (PDSCH) resource;
    determining whether the first DCI includes a carrier indication field (CIF) indicating a cross-carrier scheduling,
    wherein a non-cross carrier scheduling configuration is implemented in the carrier aggregation system if it is determined that the first DCI includes the CIF, and a cross carrier scheduling configuration is implemented in the carrier aggregation system if it is determined that the first DCI does not include the CIF; and
    determining whether a DL CC in the first set of DL CCs is not identical to at least one DL CC in the second set of DL CCs, wherein if it is determined that the first set of DL CCs is not larger than the second set of DL CCs, the UL CC monitoring set information indicates the DL CC in the first set of DL CCs in a bitmap format by setting the bits corresponding to the DL CCs in the first set of DL CCs among a plurality of DL CCs assigned to the UE, or as an index number of the indicated DL CCs with respect to a lowest CC index or a highest CC index of the plurality of DL CCs assigned to the UE, wherein if it is determined that the first set of DL CCs is larger than the second set of DL CCs, the UL monitoring set information indicates the DL CCs included in the first set of DL CCs by either using a bitmap format indicating the DL CCs not included in the second set of DL CCs among the plurality of DL CCs assigned to the UE, or as an index number of the DL CCs not included in the second set of DL CCs among the plurality of DL CCs assigned to the UE with respect to the lower or a higher index of the plurality of DL CCs assigned to the UE, and wherein if it is determined that the first set of DL CCs and the second set of DL CCs are identical, an indicator is received from the base station, wherein the indicator indicates that the first set of DL CCs and the second set of DL CCs are identical.

2. A user equipment (UE) in a carrier aggregation system, the UE comprising:

a radio frequency (RF) unit configured to transmit and receive a radio signal; and a processor coupled to the RF unit, wherein the processor is configured to:

receive uplink component carrier (UL CC) monitoring set information and downlink component carrier (DL CC) monitoring set information from a base station, wherein the UL CC monitoring set information is an indication of a first set of DL CCs on which the UE performs blind decoding to detect a first downlink control information (DCI) used for assigning physical uplink shared channel (PUSCH) resources and the DL CC monitoring set information is an indication of a second set of the DL CCs on which the UE performs blind decoding to detect a second DCI having a different format than the first DCI, used for assigning a physical downlink shared channel (PDSCH) resource;

determine whether the first DCI includes a carrier indication field (CIF) indicating a cross-carrier scheduling, wherein a non-cross carrier scheduling configuration is implemented in the carrier aggregation system if it is determined that the first DCI includes the CIF, and a cross carrier scheduling configuration is implemented in the carrier aggregation system if it is determined that the first DCI does not include the CIF and determine whether a DL CC in the first set of DL CCs is not identical to at least one DL CC in the second set of DL CCs, wherein if it is determined that the first set of DL CCs is not larger than the second set of DL CCs, the UL CC monitoring set information indicates the DL CC in the first set of DL CCs in a bitmap format by setting the bits corresponding to the DL CCs in the first set of DL CCs among a plurality of DL CCs assigned to the UE, or as an index number of the indicated DL CCs with respect to a lowest CC index or a highest CC index of the plurality of DL CCs assigned to the UE, wherein if it is determined that the first set of DL CCs is larger than the second set of DI, CCs, the UL monitoring set information indicates the DL CCs included in the first set of DL CCs by either using a bitmap format indicating the DL CCs not included in the second set of DL CCs among the plurality of DL CCs assigned to the UE, or as an index number of the DL CCs not included in the second set of DL CCs among the plurality of DL CCs assigned to the UE with respect to the lower or a higher index of the plurality of DL CCs assigned to the UE, and wherein if it is determined that the first set of DL CCs and the second set of DL CCs are identical, an indicator is received from the base station, wherein the indicator indicates that the first set of DL CCs and the second set of DL CCs are identical.

* * * * *